United States Patent
Chen et al.

(10) Patent No.: US 9,310,897 B2
(45) Date of Patent: Apr. 12, 2016

(54) DISPLACEMENT DETECTION DEVICE USING ADJUSTABLE BLOCK SIZE

(71) Applicant: PIXART IMAGING INC., Hsin-Chu County (TW)

(72) Inventors: Chun-Wei Chen, Hsin-Chu County (TW); Ren-Hau Gu, Hsin-Chu County (TW); Shih-Wei Kuo, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 130 days.

(21) Appl. No.: 14/183,620

(22) Filed: Feb. 19, 2014

(65) Prior Publication Data

US 2014/0292657 A1 Oct. 2, 2014

(30) Foreign Application Priority Data

Mar. 26, 2013 (TW) .............................. 102110816 A

(51) Int. Cl.
*G06F 3/0354* (2013.01)

(52) U.S. Cl.
CPC ................................. *G06F 3/03543* (2013.01)

(58) Field of Classification Search
CPC .............. G06F 3/033; G06F 3/0354–3/03546; G06F 3/03549; G06F 2203/033–2203/0337
See application file for complete search history.

(56) References Cited

U.S. PATENT DOCUMENTS

| | | | |
|---|---|---|---|
| 7,116,801 B2 | 10/2006 | Lin | |
| 7,142,695 B2 | 11/2006 | Lin | |
| 7,444,006 B2 | 10/2008 | Lin | |
| 2007/0008286 A1* | 1/2007 | Theytaz | G06F 3/03543 345/166 |
| 2008/0252602 A1* | 10/2008 | Kakarala | G06F 3/0317 345/166 |
| 2011/0150363 A1* | 6/2011 | Chen | G06F 3/0304 382/291 |

* cited by examiner

*Primary Examiner* — Nathan Danielsen
(74) *Attorney, Agent, or Firm* — Rosenberg, Klein & Lee

(57) ABSTRACT

There is provided a displacement detection device including a light source, an image sensor and a control and processing unit. The light source is configured to illuminate a work surface. The image sensor is configured to receive reflected light from the work surface. The control and processing unit is configured to adjust a block size of comparison blocks according to a quality parameter.

9 Claims, 8 Drawing Sheets

DISPLACEMENT DETECTION DEVICE USING ADJUSTABLE BLOCK SIZE

CROSS REFERENCE TO RELATED APPLICATION

This application claims the priority benefit of Taiwan Patent Application Serial Number 102110816, filed on Mar. 26, 2013, the full disclosure of which is incorporated herein by reference.

BACKGROUND

1. Field of the Disclosure

This disclosure generally relates to an input device and, more particularly, to a displacement detection device capable of increasing the applicable work surface.

2. Description of the Related Art

In peripheral devices of a computer system, the mouse device has become an important input device. As the conventional wheel mouse has the problem of dust accumulation, the wheel mouse is gradually replaced by the optical mouse.

The optical mouse generally calculates the displacement according to the image correlation between successive images. For example referring to FIG. 1, it shows two images F1 and F2 captured by an optical mouse. In each sampling period, an image capturing unit captures a current image F2 which is then sent to a processing unit. The image capturing unit has captured a reference image F1 in a previous sampling period. The processing unit selects a reference block RB of a predetermined size in the reference image F1 served as a target to be compared, and uses a search block SB of an identical size in the current image F2 to sequentially search the whole of the current image F2 so as to find an optimum search block that has the highest correlation with the reference block RB. Then, the processing unit calculates a position variation between a corresponding position of the reference block RB in the current image F2 and the optimum search block to be served as the outputted displacement of the optical mouse.

However, as the conventional optical mouse utilizes the reference block and the search block of a fixed size to calculate displacement, the displacement may not be calculated correctly in some conditions. For example, when the optical mouse is operated on a glass surface, the displacement may not be able to be calculated correctly.

Accordingly, the present disclosure further provides a displacement detection device that may adjust the block size of comparison blocks according to the content of detected images so as to be adapted to broad work surfaces.

SUMMARY

The present disclosure provides a displacement detection device that may adjust the block size of comparison blocks according to the exposure parameter and the image quality so as to increase the adaptability of the work surface.

The present disclosure provides a displacement detection device that may use a smaller block size when the image quality is high so as to reduce the power consumption of the device.

The present disclosure provides a displacement detection device that may be operated by a user on a work surface and adapted to the optical displacement detection device with the dark field arrangement and the bright field arrangement.

The present disclosure provides a displacement detection device including a light source, an image sensor and a control and processing unit. The light source is configured to emit a main beam illuminating the work surface and forming a main reflected light path. The image sensor is located on the main reflected light path and configured to capture a current image with an exposure parameter. The control and processing unit is configured to search the current image with a search block, calculate a quality parameter according to the current image and adjust a block size of the search block according to the exposure parameter and the quality parameter. In this embodiment, the image sensor has a bright field arrangement.

The present disclosure further provides a displacement detection device including a light source, an image sensor and a control and processing unit. The light source is configured to emit a main beam illuminating the work surface and forming a main reflected light path. The image sensor is located outside the main reflected light path and configured to capture a current image with an exposure parameter. The control and processing unit is configured to search the current image with a search block, calculate a quality parameter according to the current image and adjust a block size of the search block according to the exposure parameter and the quality parameter. In this embodiment, the image sensor has a dark field arrangement.

The present disclosure further provides a displacement detection device including a light source, an image sensor and a control and processing unit. The light source is configured to illuminate the work surface. The image sensor is configured to capture a current image with an exposure parameter. The control and processing unit is configured to search the current image with a search block, calculate a quality parameter according to the current image and adjust a block size of the search block according to the quality parameter.

In one aspect, the control and processing unit is configured to control the exposure parameter of the image sensor according to a brightness value (e.g. average brightness, maximum brightness or local average brightness) of the current image.

In one aspect, when the control and processing unit identifies that the work surface is a smooth surface according to the current image, a larger size of comparison blocks is used to calculate the displacement so as to increase the applicable work surface. When the control and processing unit identifies that the work surface is not a smooth surface, the block size of the comparison blocks is decreased or set to a predetermined block size so as to reduce the power consumption.

In one aspect, the control and processing unit increases the block size only when identifying according to a plurality of the current images that the work surface is a smooth surface so as to improve the operating stability.

In one aspect, the control and processing unit identifies that the work surface is a smooth surface when the quality parameter is smaller than a quality threshold and the exposure parameter is smaller than an exposure threshold.

In one aspect, the control and processing unit identifies that the work surface is a smooth surface when the quality parameter is smaller than a quality threshold and the exposure parameter is larger than or equal to an exposure threshold or when a quotient of the quality parameter divided by the exposure parameter is smaller than a ratio threshold.

In the displacement detection device according to the embodiment of the present disclosure, a plurality of block sizes of comparison blocks may be set associated with a plurality of quality thresholds and/or a plurality of exposure thresholds for being adapted to various work surfaces. In addition, a relationship between the quality thresholds and/or the exposure thresholds with respect to different block sizes may be formed as a lookup table for being stored in a memory unit such that when the control and processing unit obtains a pair of quality parameter and exposure parameter, a suitable size of the comparison blocks may be selected so as to improve the operating performance.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
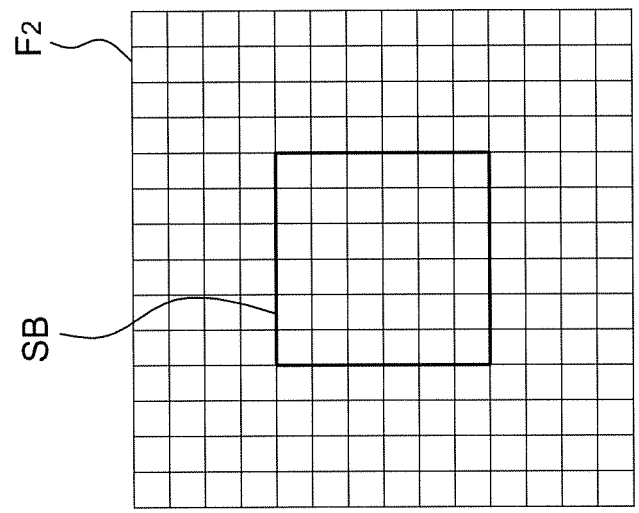
FIG. 1 shows a schematic diagram of two images captured by the conventional optical mouse.
Figure 1:
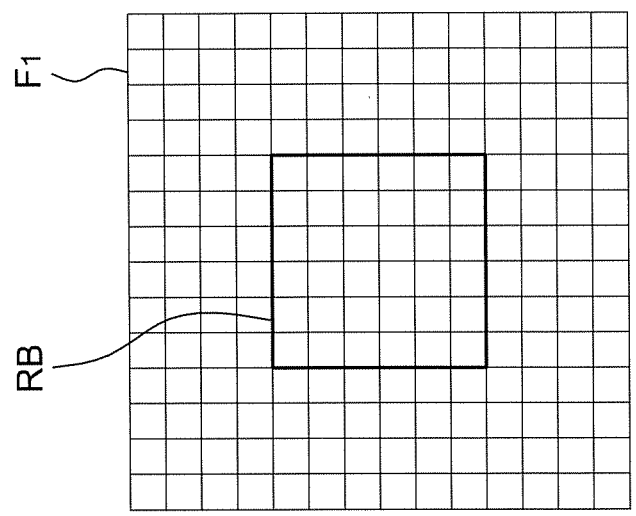
Figure 2:
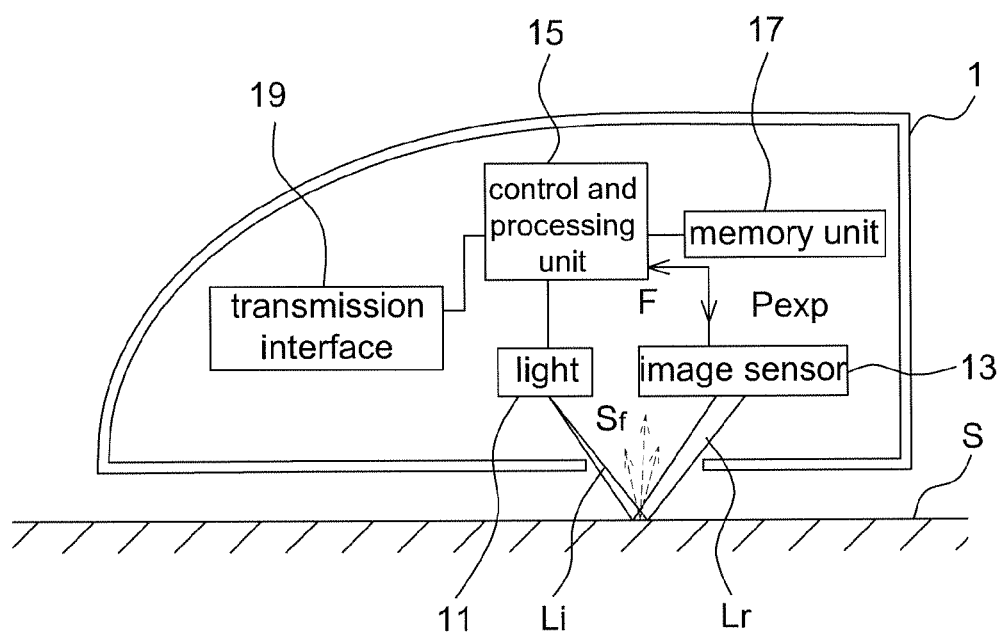
FIG. 2 shows a schematic block diagram of the displacement detection device according to an embodiment of the present disclosure.

Referring to FIG. 2, it shows a schematic block diagram of the displacement detection device according to an embodiment of the present disclosure. The displacement detection device 1 of the present disclosure may be an input device for being operated by a user on a work surface S, e.g. an optical mouse, and is configured to detect and output displacement with respect to the work surface S. The displacement detection device 1 may be configured to control the electronic device having a screen to perform the corresponding operation, e.g. conventional cursor motion control or icon selection, and details thereof are not described herein.

The displacement detection device 1 includes a light source 11, an image sensor 13, a control and processing unit 15, a memory unit 17 and a transmission interface unit 19, wherein the control and processing unit 15 is coupled to the light source 11, the image sensor 13, the memory unit 17 and the transmission interface unit 19.

The light source 11 may be a light emitting diode or a laser diode, and is configured to emit light of a predetermined spectrum to illuminate the work surface S for providing light needed by the image sensor 13 in capturing images. The light source 11 may emit a main beam Li to illuminate the work surface S, and reflected light from the work surface S may form a main reflected light path Lr, wherein as the work surface S is not a perfect mirror surface, a scattered field Sf is formed outside the main reflected light path Lr. If the light source 11 emits light with the same brightness and when the work surface S is smoother, the main reflected light path Lr has stronger intensity and the scattered field Sf has weaker intensity; whereas when the work surface S is rougher, the main reflected light path Lr has weaker intensity and the scattered field Sf has stronger intensity. Accordingly, it is able to identify whether the work surface S is a smooth surface, e.g. a glass surface, by identifying the intensity of the main reflected light path Lr and the scattered field Sf. In other words, a smooth surface may not contain enough surface features whereas a rough surface generally contains enough surface features.

The image sensor 11 may be a CCD image sensor, a CMOS image sensor or other sensing devices capable of converting optical energy to electric signals. The image sensor 11 acquires reflected light from the work surface S at a sampling frequency and with an exposure parameter and outputs current images, wherein the exposure parameter may include an exposure time and/or an image gain. In this embodiment, the exposure parameter may be determined by the control and processing unit 15, and when a value of the exposure parameter is higher, an average brightness value of the images F outputted by the image sensor 11 is increased. In the present disclosure, whether the disposed position of the image sensor 13 is on the main reflected light path Lr or not may determine a bright field arrangement or a dark field arrange arrangement, and different arrangements may determine the setting of the exposure threshold (described exemplarily below).

The control and processing unit 15 receives the images F outputted by the image sensor 13 to accordingly calculate the displacement. For example referring to FIG. 3, it shows a schematic diagram of two images F captured by the image sensor 13, e.g. including a current image 20 and a reference image 21, wherein the reference image 21 is a previous image F of the current image 20 captured by the image sensor 13 and stored in the memory unit 17. The control and processing unit 15 is configured to determine a reference block RB (e.g. reference blocks $RB_1$-$RB_3$ of three sizes shown herein) in the reference image 21 and determine a search block SB (e.g. search blocks $SB_1$-$SB_3$ of three sizes shown herein) in the current image 20, and to use the search block SB to sequentially search the current image 20 so as to find an optimum search block having the highest correlation with the reference block RB to accordingly calculate the displacement, wherein as the control and processing unit 15 compares the search block SB and the reference block RB, the search block SB and the reference block RB have identical sizes. In the descriptions herein, the search block SB and the reference block RB are referred to comparison blocks for facilitate the illustration. In addition, the methods of sequentially searching the current image 20 with the search block SB and calculating the correlation are well known. The present disclosure is to adjust the block size of the comparison blocks according to the features in the current image 20 (described later).

The control and processing unit 15 may further calculate a brightness value (e.g. average brightness, maximum brightness or local average brightness) of the current image 20 to accordingly control the exposure parameter Pexp of the image sensor 13. The control and processing unit 15 may further calculate a quality parameter according to the current image 20 and adjust a block size of the comparison blocks SB according to the exposure parameter and/or the quality parameter. It should be mentioned that when the block size of the search block SB is adjusted, the control and processing unit 15 also adjusts the block size of the reference block RB.

In addition, the control and processing unit 15 may further control the light source 11 to emit light at different lighting brightness corresponding to different image frames and calculate a differential image of the images F captured corresponding to different lighting brightness in order to eliminate the interference from ambient light.

The memory unit 17 is configured to store the reference image 21, at least one exposure threshold, at least one quality threshold and/or a lookup table, wherein the lookup table may include block sizes associated with different quality parameters and different exposure parameters. In addition, in some embodiments the current image 20 may temporarily be stored in the memory unit 17.

The transmission interface unit 19 wired or wirelessly transmits the displacement to a home appliance or a portable electronic device having a screen, e.g. a TV, a projection system, a game system and a computer system, wherein the wired and wireless technologies are well known and thus details thereof are not described herein.

Figure 4:
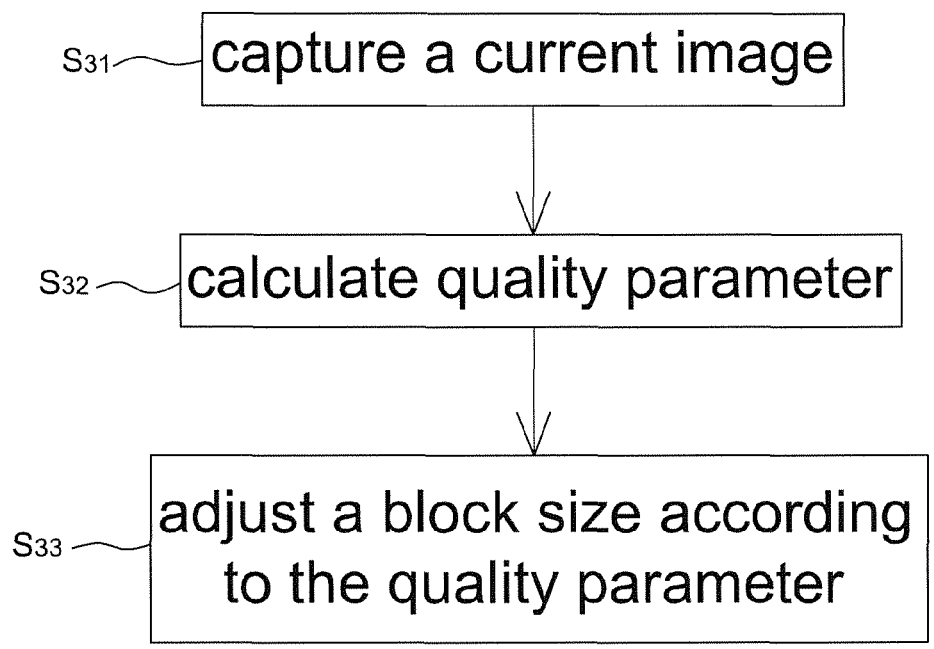
FIG. 4 shows a flow chart of the operation method of the displacement detection device according to a first embodiment of the present disclosure.

Referring to FIG. 4, it shows a flow chart of the operation method of the displacement detection device according to a first embodiment of the present disclosure. The operation method of the displacement detection device of this embodiment may include the steps of: capturing a current image with an image sensor (Step $S_{31}$); calculating a quality parameter with a control and processing unit (Step $S_{32}$); and adjusting a block size according to the quality parameter (Step $S_{33}$). In the first embodiment the block size of comparison blocks are adjusted only according to the image quality.

Figure 3:
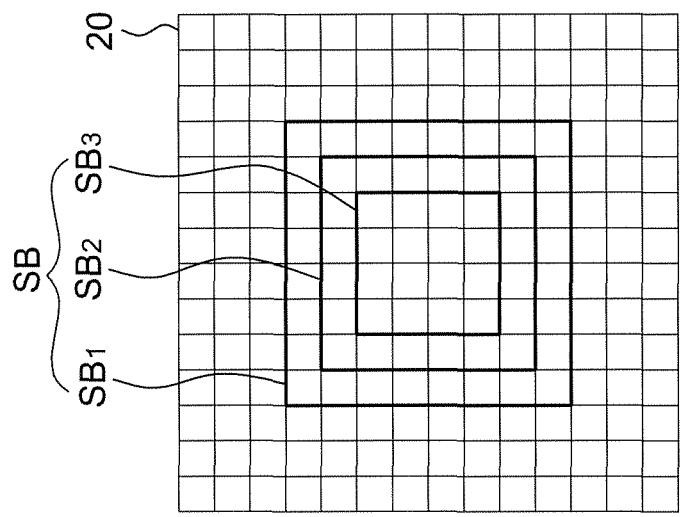
FIG. 3 shows a schematic diagram of two images captured by the displacement detection device according to the embodiment of the present disclosure.
Figure 3:
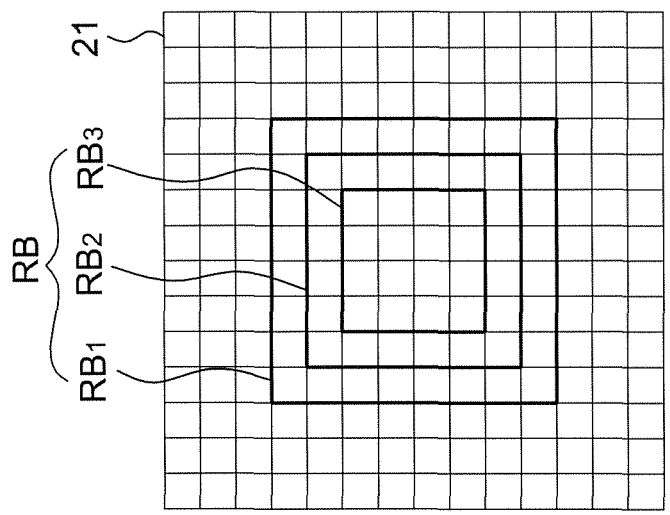

Referring to FIGS. 2-4, details of the operation method of this embodiment are described hereinafter.

Step $S_{31}$: The image sensor 13 captures a current image 20 at a sampling frequency and corresponding to the lighting of the light source 11. Meanwhile, the control and processing unit 15 may initially set the comparison blocks to a predetermined size, e.g. a second block size $SB_2$.

Step $S_{32}$: The control and processing unit 15 then calculates a quality parameter of the current image 20 for indicating the feature of the work surface S, wherein the quality parameter may be the sharpness, contrast, directivity, number of local extremes of the current image 20 and may have a numerical value. When the numerical value is higher, it means that the work surface S is rougher whereas when the numerical value is lower, it means that the work surface S is smoother. The image quality may be referred to U.S. Pat. Nos. 7,142,695, 7,444,006 and 7,116,801 assigned to the same assignee as the present application, but not limited thereto.

Step $S_{33}$: The control and processing unit 15 identifies whether the work surface S is a smooth surface (i.e. identifying whether enough surface features are contained) according to a comparison result of comparing the quality parameter and a quality threshold. For example, when the quality parameter is smaller than the quality threshold, the control and processing unit 15 identifies that the work surface S is a smooth surface (i.e. not containing enough surface features for calculating the displacement); whereas when the quality parameter is larger than or equal to the quality threshold, the control and processing unit 15 identifies that the work surface S is not a smooth surface (i.e. containing enough surface features for calculating the displacement). When the control and processing unit 15 identifies according to all current images acquired within a predetermined time interval that the work surface S is a smooth surface, e.g. identifying the work surface S is a smooth surface according to one or a plurality of current images 20, the block size is increased, wherein the term "a plurality of" herein may be 16, 32 and so on, but not limited to. The purpose of identifying according to more than one current image 20 is to increase the stability such that the block size is not changed constantly. When the control and processing unit 15 identifies according to all current images 20 acquired within a predetermined time interval that the work surface S is not a smooth surface, the block size is decreased or set to a predetermined size. In this embodiment, the quality threshold may be suitably determined according to a size of sensing array of the image sensor 13 and/or an applicable range of the work surface.

Figure 5:
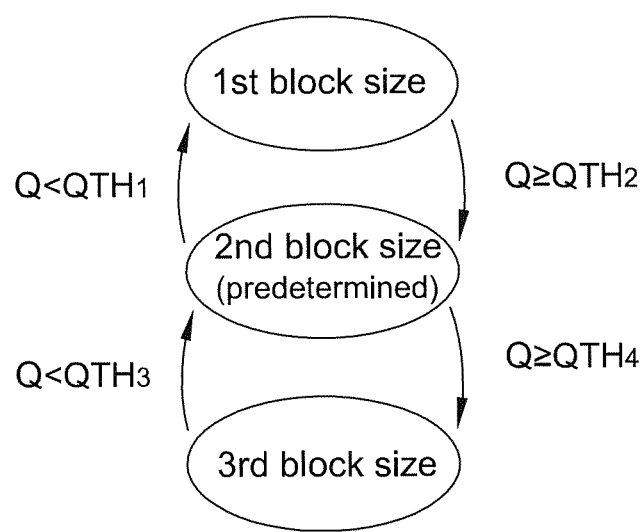
FIG. 5 shows a schematic diagram of the operation method of the displacement detection device according to the first embodiment of the present disclosure.

Referring to FIG. 5, it shows a schematic diagram of the operation method of the displacement detection device according to the first embodiment of the present disclosure. In this embodiment, it is assumed that a predetermined block size is a second block size (e.g. $SB_2$) that is between a first block size (e.g. $SB_1$) and a third block size (e.g. $SB_3$) as shown in FIG. 3, wherein the first block size $SB_1$ is larger than the third block size $SB_3$.

The image sensor 13 captures a current image 20 which is transmitted to the control and processing unit 15 (Step $S_{31}$). The control and processing unit 15 calculates a quality parameter Q of the current image 20 (Step $S_{32}$) and compares the quality parameter Q with at least one quality threshold. If a current block size is assumed to be a predetermined size (e.g. $SB_2$) and when the quality parameter Q is smaller than a first quality threshold $QTH_1$, the control and processing unit 15 uses a first block size (e.g. $SB_1$) to scan the current image 20 for calculating the displacement; whereas when the quality parameter Q is larger than or equal to a fourth quality threshold $QTH_4$, the control and processing unit 15 uses a third block size (e.g. $SB_3$) to scan the current image 20 for calculating the displacement. If a current block size is assumed to be the first block size $SB_1$ and when the quality parameter Q is larger than or equal to a second quality threshold $QTH_2$, the control and processing unit 15 decreases the block size to the second block size $SB_2$ otherwise the block size is maintained as the first block size $SB_1$. If a current block size is assumed to be the third block size $SB_3$ and when the quality parameter Q is smaller than a third quality threshold $QTH_3$, the control and processing unit 15 increases the block size to the second block size $SB_2$ otherwise the block size is maintained as the third block size $SB_3$. In this embodiment, the third quality threshold $QTH_3$ is larger than the first quality threshold $QTH_1$, and the fourth quality threshold $QTH_4$ is larger than the second quality threshold $QTH_2$. The first quality threshold $QTH_1$ may or may not be equal to the second quality threshold $QTH_2$, and the third quality threshold $QTH_3$ may or may not be equal to the fourth quality threshold $QTH_4$. More specifically speaking, in the first embodiment the control and processing unit 15 may adjust or maintain the block size of comparison blocks according to a comparison result of comparing the image quality of a current image with at least one quality threshold.

Figure 6:
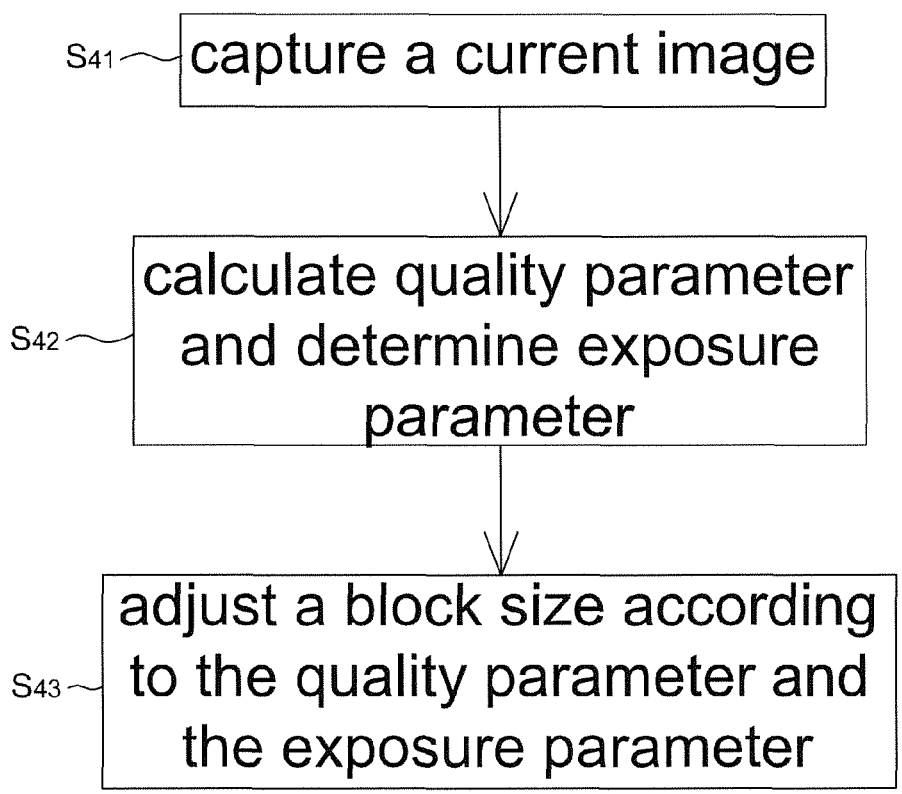
FIG. 6 shows a flow chart of the operation method of the displacement detection device according to a second embodiment of the present disclosure.

Referring to FIG. 6, it shows a flow chart of the operation method of the displacement detection device according to a second embodiment of the present disclosure. The difference between the second embodiment and the first embodiment is that in the second embodiment the control and processing unit 15 adjusts the block size further according to an exposure parameter of the image sensor 13. More specifically speaking, in the second embodiment the control and processing unit 15 compares a quality parameter with a quality threshold and compares an exposure parameter with an exposure threshold so as to determine the block size. For example, when the control and processing unit 15 identifies according to one or a plurality of current images that the work surface S does not contain enough surface features, the block size is increased; for example if the work surface S is a smooth surface, the current image may not contain enough image features. On the contrary, when the control and processing unit 15 identifies according to one or a plurality of current images that the work surface S contains enough surface features, the block size is decreased or set to a predetermined block size (described exemplarily below); for example if the work surface S is not a smooth surface, the current image generally contains enough image features.

In one embodiment, a plurality of quality parameters and a plurality of exposure parameters with respect to a plurality of block sizes may be previously formed as a lookup table, and the control and processing unit 15 may compare a pair of quality parameter and exposure parameter with the lookup table so as to determine the block size.

Figure 7A:
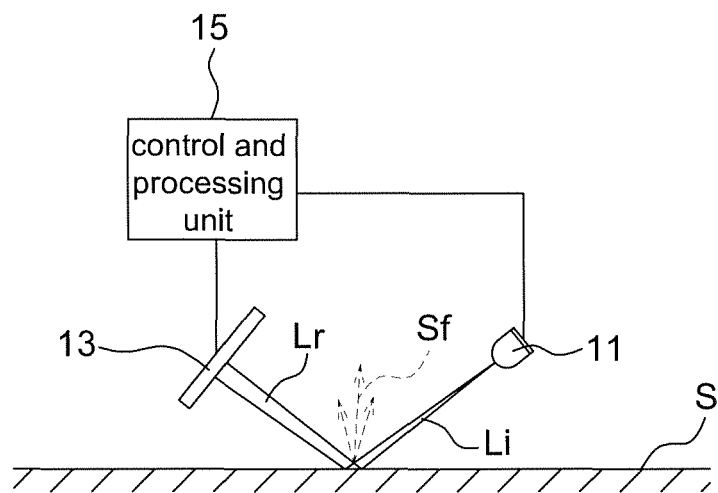
FIG. 7A shows a schematic diagram of the bright field arrangement of the displacement detection device according to the second embodiment of the present disclosure.
Figure 8A:
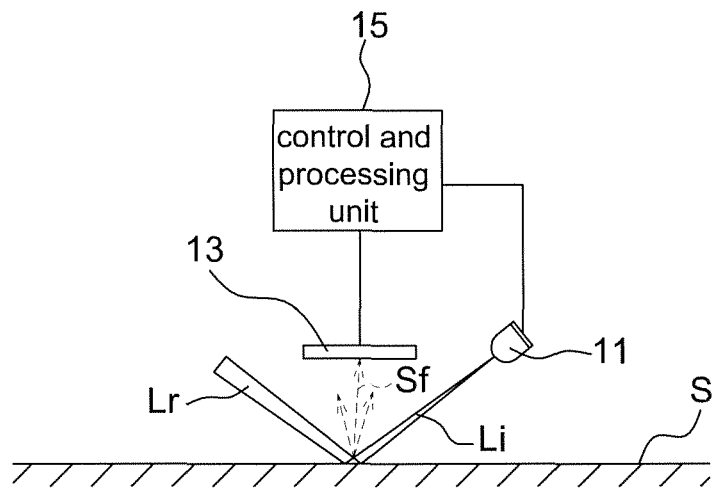
FIG. 8A shows a schematic diagram of the dark field arrangement of the displacement detection device according to the second embodiment of the present disclosure.

The operation method of the displacement detection device according to the second embodiment of the present disclosure may include the steps of: capturing a current image with an image sensor (Step $S_{41}$); calculating a quality parameter and determining an exposure parameter with a control and processing unit (Step $S_{42}$); adjusting a block size according to the quality parameter and the exposure parameter (Step $S_{43}$). In the second embodiment, a bright field arrangement or a dark field arrangement may be formed according to the disposed position of the image sensor 13, wherein in the bright field arrangement the image sensor 13 is disposed on the main reflected light path Lr as shown in FIG. 7A, and in the dark field arrangement the image sensor 13 is disposed at the scattered field Sf (i.e. outside the main reflected light path Lr) as shown in FIG. 8A.

Referring to FIGS. 2, 3, 6 and 7A, details of the bright field arrangement in the second embodiment is described at first.

Step $S_{41}$: The image sensor 13 captures a current image 20 at a sampling frequency and corresponding to the lighting of the light source 11. Meanwhile, the control and processing unit 15 may initially set the comparison blocks to a predetermined size, e.g. a second block size $SB_2$.

Step $S_{42}$: The control and processing unit 15 then calculates a quality parameter of the current image 20 and an exposure parameter for indicating the feature of the work surface S, wherein the calculation of the quality parameter may be similar to the first embodiment and thus details thereof are not described herein. The control and processing unit 15 calculates a brightness value of the current image 20 (e.g. including average brightness, maximum brightness or local average brightness) for controlling the exposure parameter of the image sensor 13, e.g. including the exposure time and/or the image gain.

Step $S_{43}$: The control and processing unit 15 then identifies whether the work surface S is a smooth surface (i.e. identifying whether enough surface features are contained) according to the exposure parameter and the quality parameter and accordingly identifies whether to adjust the block size of the comparison blocks. For example, when the quality parameter is smaller than a quality threshold and the exposure parameter is smaller than an exposure threshold, the control and processing unit 13 identifies that work surface S is a smooth surface (i.e. not containing enough surface features for calculating the displacement). As mentioned above, in order to improve the stability, the block size is increased when the control and processing unit 15 identifies according to all current images captured within a predetermined time interval that the work surface S is a smooth surface, e.g. identifying the work surface S is a smooth surface according to one or a plurality of the current images 20. In addition, when the control and processing unit 13 identifies according to all current images captured within a predetermined time interval that the work surface S is not a smooth surface (i.e. containing enough surface features for calculating the displacement), i.e. the quality parameter being larger than or equal to a quality threshold and the exposure parameter being larger than or equal to an exposure threshold, the block size is decreased or set to a predetermined block size.

Figure 7B:
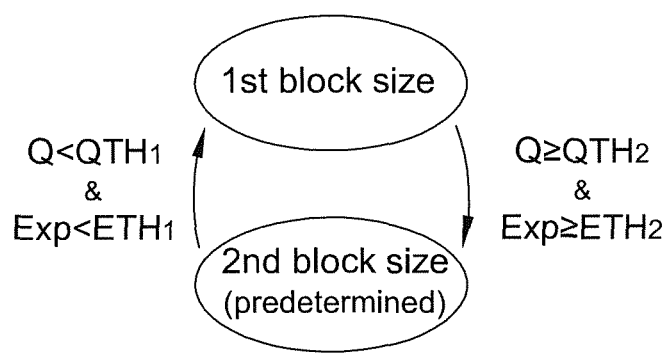
FIG. 7B shows an operational schematic diagram of the displacement detection device of FIG. 7A.

Referring to FIG. 7B, it shows a schematic diagram of the operation method of the displacement detection device of FIG. 7A. In this embodiment, it is assumed that a predetermined block size is a second block size (e.g. $SB_2$) which is smaller than a first block size (e.g. $SB_1$).

The image sensor 13 captures a current image 20 which is transmitted to the control and processing unit 15 (Step $S_{41}$). The control and processing unit 15 calculates a quality parameter Q of the current image 20 and an exposure parameter Exp (Step $S_{42}$), compares the quality parameter Q with at least one quality threshold and compares the exposure parameter Exp with at least one exposure threshold. If a current block size is assumed to be a predetermined size (e.g. the second block size $SB_2$) and when the quality parameter Q is smaller than a first quality threshold $QTH_1$ and the exposure parameter Exp is smaller than a first exposure threshold $ETH_1$, the control and processing unit 15 increases the block size to a first block size (e.g. $SB_1$) otherwise the block size is maintained as the second block size $SB_2$. If a current block size is assumed to be the first block size $SB_1$ and when the quality parameter Q is larger than or equal to a second a quality threshold $QTH_2$ and the exposure parameter Exp is larger than or equal to a second exposure threshold $ETH_2$, the control and processing unit 15 decreases the block size to the second block size $SB_2$ otherwise the block size is maintained as the first block size $SB_1$. In this embodiment, the first quality threshold $QTH_1$ may or may not be equal to the second quality threshold $QTH_2$. The first exposure threshold $ETH_1$ may or may not be equal to the second exposure threshold $ETH_2$.

Referring to FIGS. 2, 3, 6 and 8A, details of the dark field arrangement in the second embodiment is then described.

Step $S_{41}$: The image sensor 13 captures a current image 20 at a sampling frequency and corresponding to the lighting of the light source 11. Meanwhile, the control and processing unit 15 may initially set the comparison blocks to a predetermined size, e.g. a second block size $SB_2$.

Step $S_{42}$: The control and processing unit 15 then calculates a quality parameter of the current image 20 and an exposure parameter for indicating the feature of the work surface S, wherein the calculation of the quality parameter may be similar to the first embodiment and thus details thereof are not described herein. The control and processing unit 15 calculates a brightness value of the current image 20 (e.g. including average brightness, maximum brightness or local average brightness) for controlling the exposure parameter of the image sensor 13, e.g. including the exposure time and/or the image gain.

Step $S_{43}$: The control and processing unit 15 then identifies whether the work surface S is a smooth surface (i.e. identifying whether enough surface features are contained) according to the quality parameter and the exposure parameter and accordingly identifies whether to adjust the block size of the comparison blocks. For example, when the quality parameter is smaller than a quality threshold and the exposure parameter is larger than or equal to an exposure threshold, the control and processing unit 13 identifies that work surface S is a smooth surface (i.e. not containing enough surface features for calculating the displacement). As mentioned above, in order to improve the stability, the block size is increased when the control and processing unit 15 identifies according to all current images captured within a predetermined time interval that the work surface S is a smooth surface, e.g. identifying the work surface S is a smooth surface according to one or a plurality of the current images 20. In addition, when the control and processing unit 13 identifies according to all current images captured within a predetermined time interval that the work surface S is not a smooth surface (i.e. containing enough surface features for calculating the displacement), i.e. the quality parameter being larger than or equal to a quality threshold and the exposure parameter being smaller than an exposure threshold, the block size is decreased or set to a predetermined block size.

In another embodiment, the control and processing unit 13 may also compares a quotient of the quality parameter divided by the exposure parameter with a ratio threshold so as to identify whether the work surface S is a smooth surface (i.e. identifying whether enough surface features are contained). For example, when quotients obtained according to the current images captured within a predetermined time interval are all smaller than the ratio threshold, the control and processing unit 13 identifies that the work surface S is a smooth surface (i.e. not containing enough surface features for calculating the displacement). On the contrary, when quotients obtained according to the current images captured within a predetermined time interval are all larger than or equal to the ratio threshold, the control and processing unit 13 identifies that the work surface S is not a smooth surface (i.e. containing enough surface features for calculating the displacement).

Figure 8B:
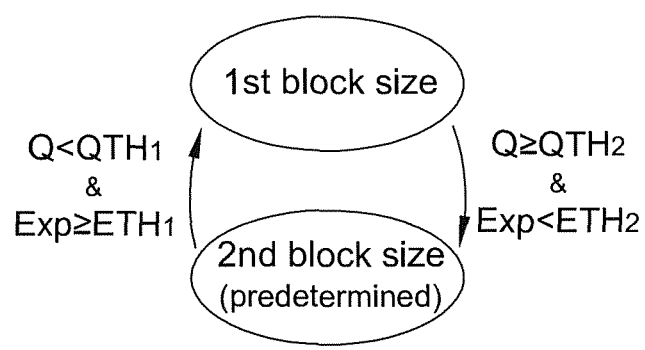
FIG. 8B shows an operational schematic diagram of the displacement detection device of FIG. 8A.

Referring to FIG. 8B, it shows a schematic diagram of the operation method of the displacement detection device of FIG. 8A. In this embodiment, it is assumed that a predetermined block size is a second block size (e.g. $SB_2$) which is smaller than a first block size (e.g. $SB_1$).

The image sensor 13 captures a current image 20 which is transmitted to the control and processing unit 15 (Step $S_{41}$). The control and processing unit 15 calculates a quality parameter Q of the current image 20 and an exposure parameter Exp (Step $S_{42}$), compares the quality parameter Q with at least one quality threshold and compares the exposure parameter Exp with at least one exposure threshold. If a current block size is assumed to be a predetermined size (e.g. the second block size $SB_2$) and when the quality parameter Q is smaller than a first quality threshold $QTH_1$ and the exposure parameter Exp is larger than or equal to a first exposure threshold $ETH_1$ (or a quotient of the quality parameter divided by the exposure is smaller than a first ratio threshold), the control and processing unit 15 increases the block size to a first block size (e.g. $SB_1$) otherwise the block size is maintained as the second block size $SB_2$. If a current block size is assumed to be the first block size $SB_1$ and when the quality parameter Q is larger than or equal to a second quality threshold $QTH_2$ and the exposure parameter Exp is smaller than a second exposure threshold $ETH_2$ (or a quotient of the quality parameter divided by the exposure parameter is larger than or equal to a second ratio threshold), the control and processing unit 15 decreases the block size to the second block size otherwise the block size is maintained as the first block size $SB_1$. In this embodiment, the first quality threshold $QTH_1$ may or may not be equal to the second quality threshold $QTH_2$. The first exposure threshold $ETH_1$ may or may not be equal to the second exposure threshold $ETH_2$. The first ratio threshold may or may not be equal to the second ratio threshold.

It is appreciated that the operation method of the displacement detection device according to the second embodiment of the present disclosure may also employ more than two quality thresholds and/or exposure thresholds, and the selectable block sizes may also larger than 2 as shown in FIG. 5 and are not limited to those shown in FIGS. 7B and 8B.

It should be mentioned that the block size of the comparison blocks and the values mentioned in the above embodiments are only intended to illustrate but not to limit the present disclosure.

As mentioned above, the conventional optical mouse utilizes the comparison blocks of a fixed size to calculate displacement such that the displacement may not be calculated correctly in some conditions. Therefore, the present disclosure further provides a displacement detection device (FIGS. 2, 7A and 8A) that may determine the block size of comparison blocks (including the reference block and the search block) according to the exposure parameter in capturing images and the image quality thereby achieving the object of increasing the adaptability of the work surface and reducing the power consumption of the device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A displacement detection device, for being operated on a work surface, the displacement detection device comprising:
   a light source configured to emit a main beam illuminating the work surface and forming a main reflected light path;
   an image sensor located outside the main reflected light path and configured to capture a current image with an exposure parameter; and
   a control and processing unit configured to
      search the current image with a search block,
      calculate a quality parameter according to the current image,
      adjust a block size of the search block according to the exposure parameter and the quality parameter, and
      identify that the work surface does not contain enough surface features when a quotient of the quality parameter divided by the exposure parameter is smaller than a ratio threshold.

2. The displacement detection device as claimed in claim 1, wherein the block size is increased when the control and processing unit identifies according to one or a plurality of the current images that the work surface does not contain enough surface features.

3. The displacement detection device as claimed in claim 1, wherein the control and processing unit is further configured to calculate a brightness value of the current image to accordingly control the exposure parameter of the image sensor.

4. The displacement detection device as claimed in claim 3, wherein the brightness value is average brightness, maximum brightness or local average brightness of the current image.

5. The displacement detection device as claimed in claim 1, further comprising a memory configured to store a lookup table containing a relationship between a plurality of quality thresholds with respect to different block sizes for selecting the block size.

6. The displacement detection device as claimed in claim 1, further comprising a memory configured to store a lookup table containing a relationship between a plurality of exposure thresholds with respect to different block sizes for selecting the block size.

7. The displacement detection device as claimed in claim 1, wherein the displacement detection device is an optical mouse.

8. The displacement detection device as claimed in claim 1, wherein the exposure parameter comprises at least one of an exposure time and an image gain.

9. The displacement detection device as claimed in claim 1, wherein the control and processing unit is further configured to
- control the light source to emit light at different lighting brightness corresponding to different image frames; and
- calculate a differential image of images captured corresponding to the different lighting brightness.

* * * * *